(12) United States Patent
Kim

(10) Patent No.: US 6,724,447 B2
(45) Date of Patent: Apr. 20, 2004

(54) LIQUID CRYSTAL DISPLAY

(75) Inventor: Yong Wan Kim, Kyongsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 397 days.

(21) Appl. No.: 09/894,780

(22) Filed: Jun. 29, 2001

(65) Prior Publication Data

US 2002/0003519 A1 Jan. 10, 2002

(30) Foreign Application Priority Data

Jul. 4, 2000 (KR) .................................. 10-2000-38014

(51) Int. Cl.$^7$ ..................... G02F 1/1335; G02F 1/1339; G02F 1/1343
(52) U.S. Cl. .......................... 349/106; 349/155; 349/38
(58) Field of Search ................................ 349/106, 155, 349/38, 43

(56) References Cited

U.S. PATENT DOCUMENTS

| | | | | | |
|---|---|---|---|---|---|
| 5,790,219 | A | * | 8/1998 | Yamagishi et al. | 349/106 |
| 5,844,645 | A | * | 12/1998 | Kashimoto | 349/106 |
| 6,535,264 | B1 | * | 3/2003 | Imabayashi et al. | 349/155 |

* cited by examiner

Primary Examiner—Toan Ton
(74) Attorney, Agent, or Firm—Morgan, Lewis & Bockius LLP

(57) ABSTRACT

A liquid crystal display is provided that includes a first substrate including a thin film transistor and a storage capacitor, a second substrate including a color filter layer with a recess at a location opposite to the storage capacitor, a common electrode on the color filter layer, and a liquid crystal layer between the first and second substrates. Spacers are provided between the first and second substrates to maintain a gap therebetween. In regions that include the storage capacitor, the recess compensates for a height difference in layers forming the capacitor on the first substrate to maintain a substantially uniform liquid crystal layer thickness over the whole region of the liquid crystal display, and thus provides a high quality picture.

8 Claims, 3 Drawing Sheets

LIQUID CRYSTAL DISPLAY

This application claims the benefit of Korean Patent Application No. P 2000-38014, filed on Jul. 4, 2000, which is hereby incorporated by reference.

BACKGROUND OF THE INVENTION

1. Field of the Invention

The present invention relates to a LCD (Liquid Crystal Display), and more particularly, to an LCD having a balanced layer of liquid crystal.

2. Background of the Related Art

Thin-film transistor liquid crystal displays (TFT-LCD's) are widely used as display elements for LCD TVs, notebook PCs, LCD game machines, projection TVs, high definition TVs (HD-TVs), and the like. Recent interest in flat panel displays has led to the development of flat panel TFT-LCDs, and demand for these devices is steadily increasing. The development of TFT-LCD's and their applications are driven, and sometimes accelerated by a desire for display panel size increase and/or enhanced resolution. Accordingly, there have been ceaseless efforts to simplify the fabrication process and improve manufacturing yields of TFT-LCDs to attain increased productivity at low cost.

Unlike a Plasma Display Panel (PDP) or a Field Emission Display (FED), an LCD requires back lighting to illuminate the display screen. The back light is a light source that is provided to transmit light through a plurality of separately controllable liquid crystal pixels formed in the LCD. In operation, the transmissivity of light from the light source is varied in accordance with voltages applied across electrodes provided on either side of the liquid crystal. The transmissivity through a pixel may be varied independently for each pixel utilizing electrooptic properties of the liquid crystal injected inside the panel. The liquid crystal directs the light from the back light to display an image on the LCD panel screen according to a pattern of pixels that are charged with a voltage.

FIG. 1 is a simplified plan view of an LCD layout the related art. Referring to FIG. 1, the related art LCD includes a plurality of gate lines 11 formed at fixed intervals and data lines 13 formed perpendicular to the gate lines 11. At each intersection of the gate lines 11 and the data lines 13, a TFT is provided for controlling a voltage charged to an LCD pixel associated with the TFT. Each TFT includes a gate electrode 11a extending from the gate line 11, source and drain electrode 13a extending from the data line 13, drain electrode 13b and pixel electrode 15 connected to the drain electrode 13b. A storage capacitor 17 is provided for sustaining a charged liquid crystal voltage and is formed by an overlap of the gate line 11 and the pixel electrode 15.

FIG. 2 provides a cross-sectional view of the related art LCD pixel taken across a line I–I' in FIG. 1 to illustrate details of an LCD pixel structure. As shown in FIG. 2, a pixel TFT and capacitor are formed on the substrate 21. The TFT includes a gate electrode 23. On the gate electrode 23 and the substrate 21 is formed a gate insulating film 27. An amorphous silicon (a-Si) active layer 29 and a divided $n^+$ layer 30 are stacked on the gate insulating film 27 over the gate electrode 23. A source electrode 32 and a drain electrode 34 are formed on the $n^+$ layer 30 and spaced from one another. Spaced from the TFT is a first electrode 25 of the storage capacitor. The gate insulating film 27 extends over the substrate 21 and covers the first storage capacitor electrode 25. A second electrode 25a of the storage capacitor is formed on the extended gate insulating film 27 over the first electrode 25 of the storage capacitor. A passivation layer 36 is formed on the entire resultant surface that includes the source electrode 32, the drain electrode and 34, and the second electrode 25a of the storage capacitor. A pixel electrode 38 is formed on the passivation layer 36 an is connected to the drain electrode 34 and the second electrode 25a of the storage capacitor through contact holes formed in the passivation layer 36.

Overlying the first substrate 21 is a second transparent substrate 21a. On the second substrate 21a, a black matrix (light shielding) layer 40 and a color filter layer 42 are formed on the second substrate 21a. A common electrode 44 is formed on an entire surface inclusive of the color filter layer 42 and the black matrix layer 40. A liquid crystal layer 100 is provided between the first substrate 21 and the second substrate 21a. However, a large step difference exists in the area of the substrate 21 where the storage capacitor Cs is formed. To compensate for an unbalance caused by the difference in height around the area of capacitor Cs, spacers 101 and 103 are provided to restrict a gap between the first substrate and the second substrate 21a, and to maintain an appropriate thickness of the liquid crystal layer 100. The liquid crystal layer 100 typically has a thickness of approximately 5 μm in areas of the pixel absent the steps formed by the capacitor Cs and the TFT. The spacers are plastic granules that are compressible by 10~20% of an uncompressed granule diameter.

The related art LCD of FIG. 2 shows how a step difference of 1.25 μm in the area of storage capacitor Cs is compensated when it is desired that the liquid crystal layer 100 has a thickness of 5.1 μm in areas of the pixel where no step differences exist. Spacers 101 and 103 have uncompressed diameters of approximately 4.75 μm. When the first substrate 21 including the TFT and capacitor Cs and the second substrate 21a including the shielding layer 40, color filter layer 42 and the common pixel electrode 44 are arranged to provide the desired liquid crystal thickness, the spacer 101 in the region of the storage capacitor Cs is compressed approximately 20%. However, in the region outside area of capacitor Cs, the spacer 103 is not compressed, and thus retains its diameter approximately 4.75 μm to allow for a balance of liquid crystal thickness in this region.

In the related art LCD, when a signal voltage is provided by a gate driver (not shown) to the gate electrode 23 of the TFT, the TFT is turned on to provide a signal on the data line to the pixel electrode 38 connected to the drain electrode 34. The signal provided to the pixel electrode 38, together with a common voltage level (relative to the signal on electrode 38) applied to common electrode 44, defines a voltage difference across electrodes 38, 44 to thereby charge the pixel cell. The liquid crystal layer 100 and the spacers 101 and 103 for adjusting the gap between the first and second substrates 21 and 21a are located between the pixel electrode 38 and common electrode 44. More specifically, a signal voltage applied between the common electrode 44 on the second substrate 21a and the pixel electrode 38 on the first substrate 21 controls the orientation of molecules of the liquid crystal between the electrodes to allow control of the transmissivity of light through a liquid crystal cell in accordance with the applied voltage.

However, the related art LCD has the following problems. When the spacer 101 in the region of the storage capacitor is compressed by 20% of its diameter, a 0.35 μm gap difference still remains between the regions of the pixel where no storage capacitor Cs is formed. In this case, there is a thickness difference of the liquid crystal layer between a region where a storage capacitor is formed and the regions surrounding the capacitor. As a measure for accommodating height differences, spacers of elastic granules are provided in the related art. However, the spacers of the related art cannot compensate for step differences that exceed an elastic range of the spacers. In this case, gaps form in parts of the liquid crystal layer causing in blurs and ripples on the screen and resulting in poor picture quality. Thus, there remains a need in the art for LCD structures that compensate for step differences within panel substrates to maintain an effective gap for liquid crystal provided between the substrates.

SUMMARY OF THE INVENTION

Accordingly, the present invention is directed to a liquid crystal display (LCD) that substantially obviates one or more of the problems due to limitations and disadvantages of the related art.

One aspect of the present invention is an LCD in which a height difference of a liquid crystal layer is compensated to form a uniform liquid crystal layer on an entire region.

Additional features and advantages of the invention will be set forth in the description that follows, and in part will be apparent from the description, or may be learned by practice of the invention. The objectives and other advantages of the invention will be realized and attained by the structure particularly pointed out in the written description, and claims hereof as well as the appended drawings.

To achieve these and other advantages in accordance with the present invention, as embodied and broadly described the liquid crystal display includes a first substrate, a thin film transistor and a storage capacitor provided on the first substrate, a second substrate, a color filter layer on the second substrate and including a recess at a location opposite to the storage capacitor, a common electrode on the color filter layer, and a liquid crystal layer including spacers between the first and second substrates.

In another aspect of the present invention, a liquid crystal display device includes a first substrate. A plurality of gate lines and a plurality of data lines are provided on the first substrate, and the data lines cross the gate lines. A thin film transistor and a pixel electrode are arranged at each intersections of the gate lines and data lines and a storage capacitor is defined by an overlap of one of the pixel electrodes and one of the plurality of gate lines. A black matrix layer is formed on a second substrate opposite the first substrate for blocking transmission of light through parts of the liquid crystal display excluding the pixel electrode. A color filter layer is formed on an substantially an entire surface of the second substrate inclusive of the black matrix layer and including a recess at a location opposite the storage capacitor. A common electrode is formed on substantially an entire surface of the color filter layer, and a liquid crystal layer including spacers is formed between the first and second substrates.

In yet another aspect of the present invention, a display apparatus includes a plurality of pixels arranged into a array between a first substrate and a second substrate. Each of the plurality of pixels display a unit portion of an image corresponding to a data signal of a plurality of data signals. A first driver is provided for selectivity applying the plurality of data signals along respective ones of a plurality of data lines provided on a first substrate. A plurality of switches are arranged into an array on a first substrate and are addressable by control signals provided along a plurality of control lines on the first substrate. A second driver is provided for selectively applying the control signals to the control lines. A charge storing capacitor is associated with each of the switches and is provided on the first substrate. The capacitor stores charge provided by one of the data lines when the switch associated with the capacitor is driven in an on state. Because each of the capacitors form a step structure on the first substrate, spacers are arranged between the first and second substrates for maintaining a gap therebetween. The spacer means are positioned over the step structure and in areas other than over the step structure, and the second substrate includes compensating means for accommodating at least a portion of the spacer over the step structure in correspondence with a height of the step to thereby maintain a substantially uniform cell gap.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
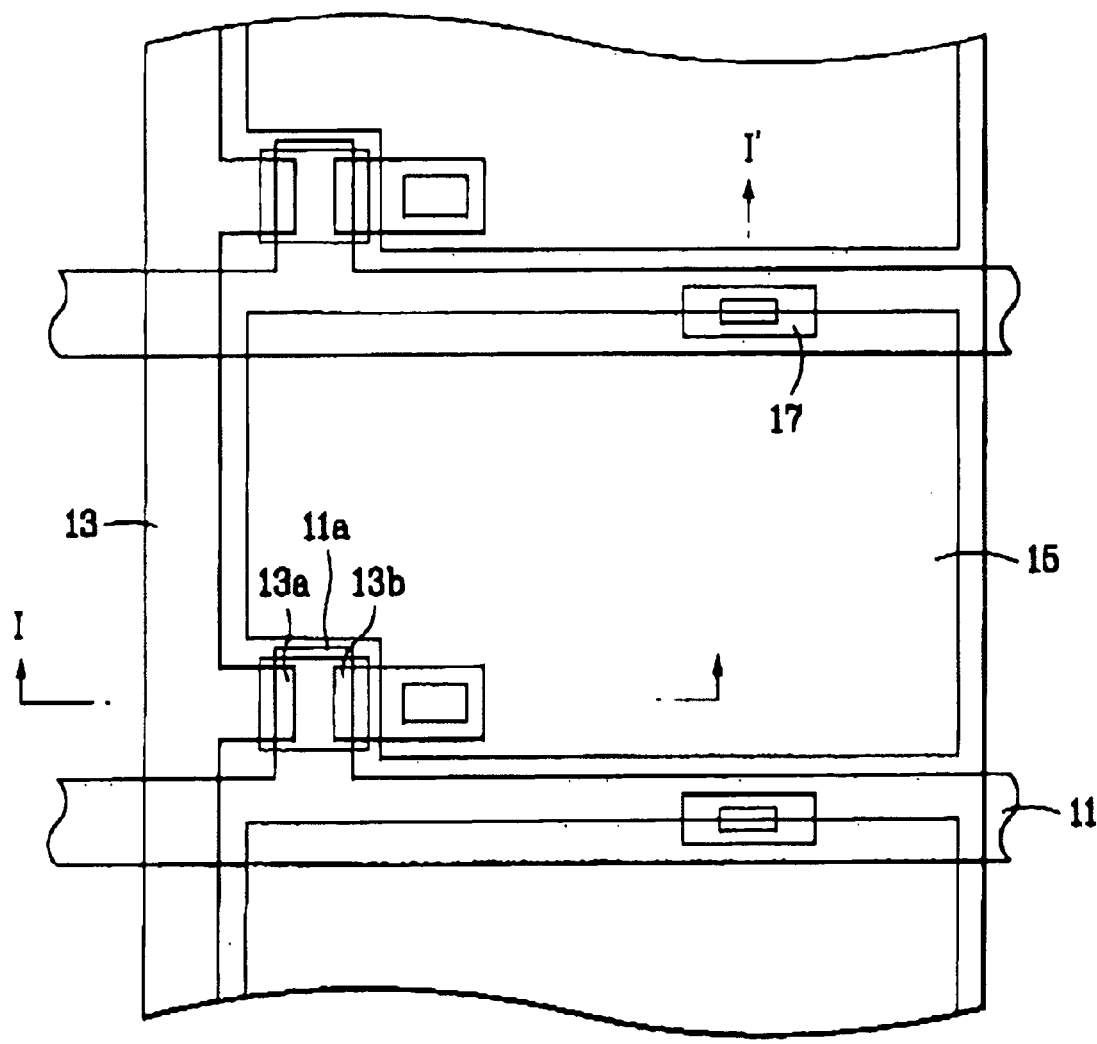
FIG. 1 provides a plan view illustrative of a layout of a related at LCD.
Figure 2:
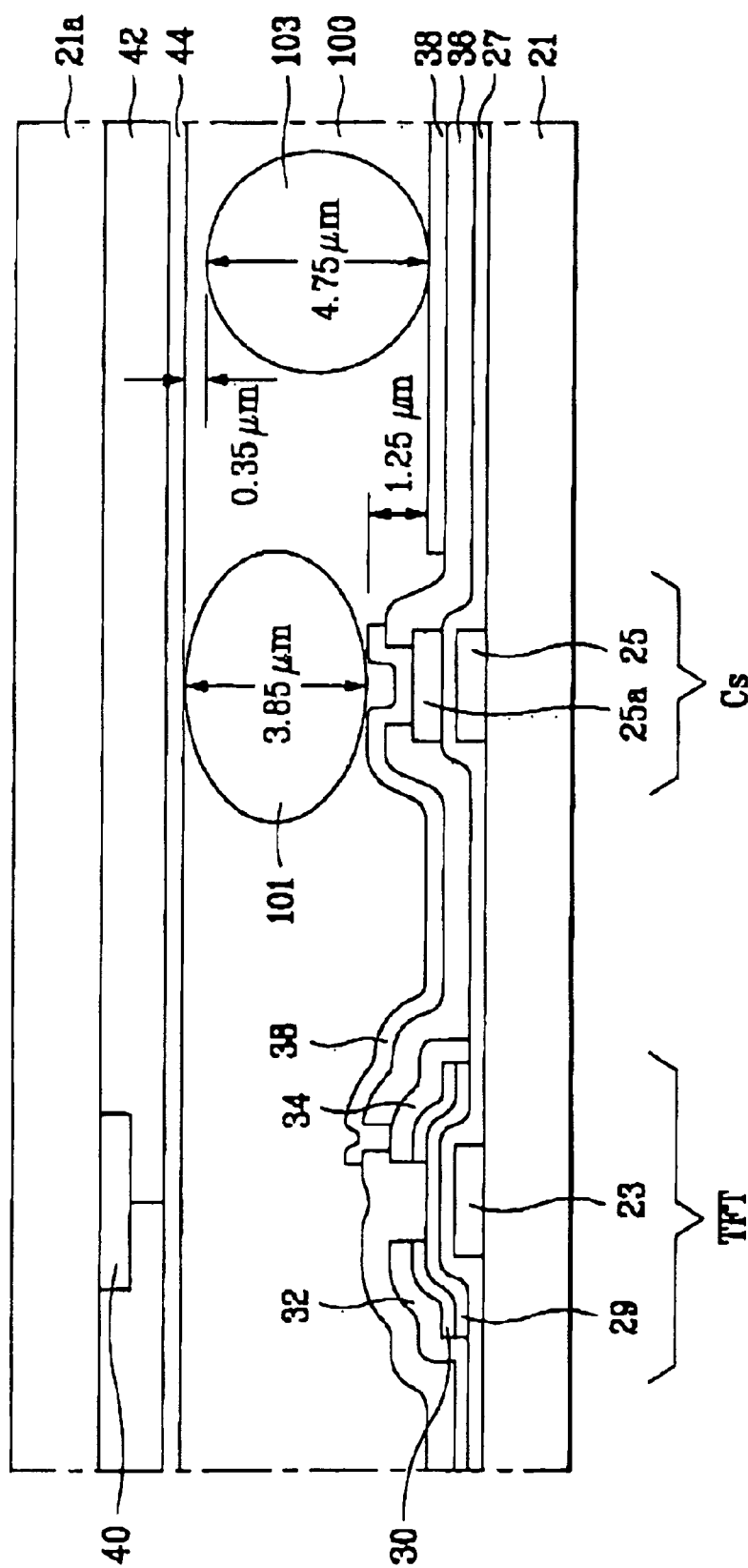
FIG. 2 illustrates a cross-sectional view of FIG. 1 taken along line I–I'.
Figure 3:
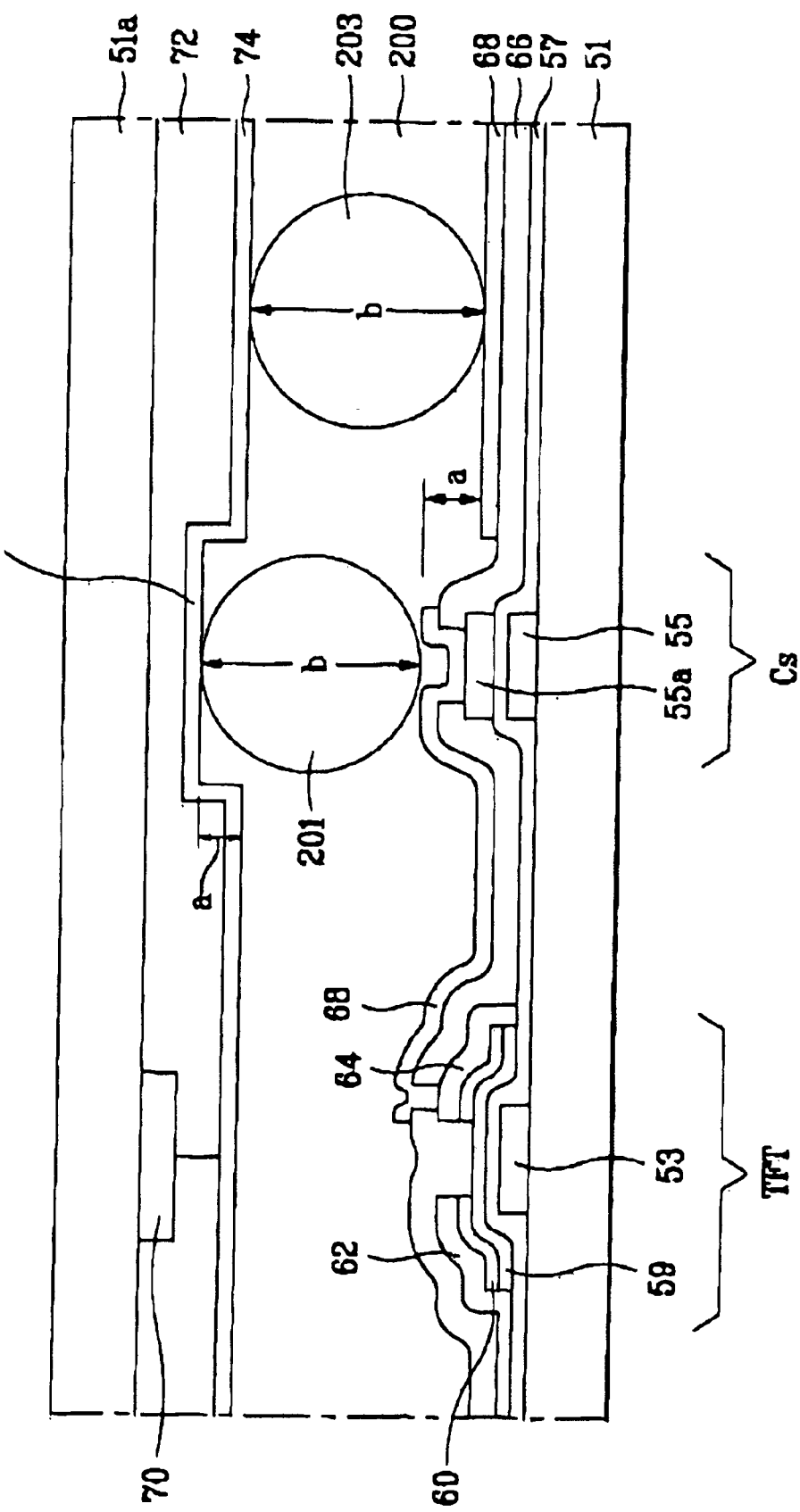
FIG. 3 illustrates a section of an LCD in accordance with an exemplary embodiment of the present invention.

FIG. 3 is illustrative of a cross-section of an LCD in accordance with a preferred embodiment of the present invention. With reference to FIG. 3, the system that is formed on a first substrate 51 is substantially identical to the system formed on the related art first substrate (shown in FIG. 2). However, the LCD structure of FIG. 3 is exemplary, i.e., provided for illustrative purposes only, and it is to be understood that the present invention may be used in other LCD structures having steps resulting from height differences on LCD substrate(s) between which a liquid crystal is provided.

As shown in. FIG. 3, a TFT and a capacitor Cs are formed on a first substrate 51. The TFT include a gate electrode 53 formed on the first substrate 51. A gate insulating film 57 is provided on the first substrate 51 and on the gate electrode 53. An amorphous silicon (a-Si) active layer 59 and a divided $n^+$ layer 60 are stacked on the gate insulating film 57 and the gate electrode 53. A source electrode 62 and a drain electrode 64 are formed on the $n^+$ layer 60 and spaced from each other. The capacitor Cs includes a first electrode 55 that is also is formed on the first substrate 51 and spaced from the gate electrode 53. The gate insulating film is provided on the first electrode 55, and a second electrode 55a of the storage capacitor Cs is formed on the gate insulating film 57 over the first electrode 55. A passivation layer 66 is filmed on substantially an entire resultant surface that includes the source and drain electrodes 62, 64, and the second electrode 55a of the storage capacitor. A pixel electrode 68 is formed on the passivation layer 66 and is connected to the drain electrode 64 and the second electrode 55a of the storage capacitor through contact holes provided in the passivation layer 66.

On a second substrate 51a, a black matrix layer 70 may be provided at parts overlying areas excluding the pixel electrodes for preventing a light from transmitting through to elements on the substrate, such as the TFTs, for example, whose operation may be adversely affected by transmitted light. A color filter layer 72 is provided on the second substrate 51a, and a common pixel electrode 74 is provided on the color filter layer 72.

In the color filter layer 72 and the common pixel electrode 74, a recess 73 is provided at a location opposite the storage capacitor Cs having a depth varied in accordance with the height difference caused by the storage capacitor Cs. For example, when a height difference is 'a' μm, the depth of the recess may be formed to be within a range about 'a' μm to compensate for the height difference. Also, a similar recess may be formed in the color filter layer 72 and common pixel electrode 74 at a location opposite the TFT.

A liquid crystal layer 200 is injected between the first substrate 51 and second substrate 51a of the foregoing LCD and includes spacers 201 and 203 that are provided to control a gap between the substrates. As shown in FIG. 3, the thickness of the liquid crystal layer in a region including a storage capacitor Cs is substantially the same as in regions that do not include a storage capacitor. This effect is explained by the position and depth of the recess 73 of the present invention within the structure of the second substrate 51a. The position of the spacer 201 between an upper part of the storage capacitor Cs and the recess 73 in the color filter layer 72 allows little or no compression of the spacer 201 (such as in the case in the related art LCD due to lack of space). The spacer 201 thus maintains a diameter b or a diameter substantially identical to the diameter b of the spacer 203 positioned in a region other than, a region including a storage capacitor.

Even in a case when a height difference caused by the storage capacitor Cs is greater than a range of spacer elasticity (e.g., approximately in the range of 10~20%), as the case may be, spacers with substantially identical diameters may be applied to the region including the storage capacitor Cs and in regions that do not include a storage capacitor, explained below in more detail.

Referring to FIG. 3, it is assumed that the liquid crystal layer 200 has a thickness of 4.75 μm and the height difference caused by the storage capacitor Cs is 1.25 μm. Of course, it is to be understood that these dimensions are exemplary for the purpose of explaining the invention, i.e., the present invention may be practiced in other LCD's that require a different liquid crystal layer thickness and/or include a different height difference. It also is to be understood that the depth of the recess 73 may be less than an amount that the spacer elasticity permits without adversely affecting the balance of the liquid crystal thickness. For example, a depth of the recess 73 may be less than the height difference "a" caused by the storage capacitor Cs as long as the difference therebetween is within the compressible range of the spacer 201.

In the exemplary embodiment described above, a balance in liquid crystal thickness is maintained between regions of the liquid crystal layer 200 where the storage capacitor Cs is formed and where no storage capacitor Cs is formed because the recess 73 is formed in the color filter layer 72 to a depth of about 1.25 μm at a position opposite the storage capacitor Cs. The recess 73 may be formed when forming the color filter layer 72 or after the color filter layer 72 is formed.

In the LCD having the recess formed in the color filter layer 72 for compensating the height difference caused by the storage capacitor Cs, when a signal is provided to the gate line 53, the TFT is turned on to transmit a signal on the data line to the pixel electrode 68. In other words, a liquid crystal cell can be operated by applying a signal voltage between the common electrode 74 on the second substrate 51a and the pixel electrode 68 on the first substrate 51 to control orientation of the liquid crystal molecules between the two electrodes.

As should be clear from the embodiment described above, the LCD of the present invention compensates for a step that is formed by a storage capacitor by providing a recess in a color filter layer. Even when a height of the step exceeds an elastic range of spacers used to form a gap between substrates, an overall thickness of the liquid crystal layer can be made substantially uniform to reduce blurs and/or ripples, and thereby provide an LCD capable of producing high picture quality.

It will be apparent to those skilled in the art that various modifications and variations can be made in the LCD of the present invention without departing from the spirit or scope of the invention. Thus, it is intended that the present invention cover the modifications and variations of this invention provided they come within the scope of the appended claims and their equivalents.

What is claimed is:

1. A liquid crystal display comprising:
   a first substrate;
   a thin film transistor and a storage capacitor provided on the first substrate;
   a second substrate;
   a color filter layer on the second substrate and including a recess at a location opposite to the storage capacitor;
   a common electrode on the color filter layer; and
   a liquid crystal layer including spacers between the first and second substrates.

2. The liquid crystal display as claimed in claim 1, wherein the recess has a depth corresponding to a height difference caused by the storage capacitor over the first substrate.

3. The liquid crystal display as claimed in claim 1, wherein the spacers are elastic and have approximately the same diameter in an uncompressed state for ones of the spacers overlying a first region where the storage capacitor is located and ones of the spacers positioned in a second region that does not include the storage capacitor.

4. The liquid crystal display as claimed in claim 2, wherein the height difference caused by the storage capacitor is greater than an allowable elastic range of the spacers.

5. A liquid crystal display comprising:
   a first substrate;
   a plurality of gate lines on the first substrate;
   a plurality of data lines on the first substrate, the data lines crossing the gate lines;
   a thin film transistor and a pixel electrode arranged at each intersection of the gate lines and data lines;
   a storage capacitor defined by an overlap of one of the pixel electrodes and one of the plurality of gate lines;
   a black matrix layer formed on a second substrate opposite the first substrate for blocking transmission of light through parts of the liquid crystal display excluding the pixel electrode;
   a color filter layer formed on an substantially an entire surface of the second substrate inclusive of the black matrix layer and including a recess at a location opposite the storage capacitor;

a common electrode formed on substantially an entire surface of the color filter layer; and a liquid crystal layer including spacers formed between the first and second substrates.

6. The liquid crystal display as claimed in claim 5, wherein the recess has a depth corresponding to a height difference caused by the storage capacitor over the surface of the first substrate.

7. The liquid crystal display as claimed in claim 5, wherein ones of the spacers in a first region including the storage capacitor and ones of the spacers in a second region that does not include the storage capacitor have substantially the same diameter.

8. The liquid crystal display as claimed in claim 6, wherein the height difference caused by the storage capacitor is greater than an allowable elastic range of the spacer.

* * * * *